March 6, 1962  J. NABUDA  3,023,471
ADJUSTABLE CLIP
Filed Sept. 22, 1958

INVENTOR.
JOHN NABUDA
BY
ATTORNEY

United States Patent Office 3,023,471
Patented Mar. 6, 1962

3,023,471
ADJUSTABLE CLIP
John Nabuda, 9332 Sarsota, Detroit 39, Mich.
Filed Sept. 22, 1958, Ser. No. 762,455
1 Claim. (Cl. 24—116)

This invention relates to fishing tackle generally, and more particularly to an adjustable clip for use on fishing leaders.

In the manufacture of fishing leaders, it is common practice to use sections of solid or braided wire, to which a number of swivel connectors are attached. Since the distances between the attached swivel connectors on standard leaders cannot be changed at will, it is necessary for a fisherman to carry a large variety of leaders so as to have the necessary tackle for different types of fishing.

Cognizant of this situation, the applicant has, as the primary object of his invention, the provision of a fishing leader having thereon a plurality of readily adjustable clips on which lines can be conveniently attached.

Another object of the invention is the provision of a fishing leader, of the type previously described, which is easy to manipulate and relatively inexpensive to produce.

A further object of the invention is the provision of a fishing leader, of the type previously described, which is almost entirely assembled from standard items of tackle.

Additional features and advantages of the invention will become apparent after consideration of a detailed discussion of the same composed with reference to the accompanying drawings constituting a portion of this application, and in which.

Figure 1:
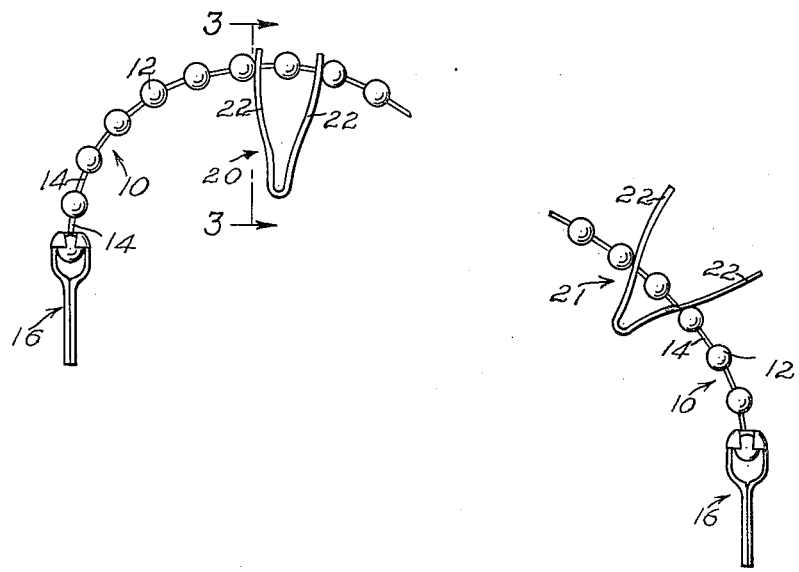
FIGURE 1 is an elevation view of a fishing leader embodying the applicant's invention, showing a pair of attached clips.
Figure 2:
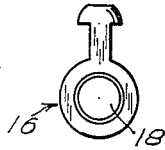
FIGURE 2 is an elevation view taken substantially on plane 2—2 in FIGURE 1, showing structural details of the end swivels.
Figure 3:
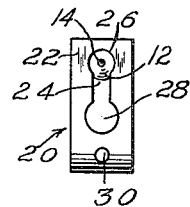
FIGURE 3 is a side elevation view of a clip disclosed in FIGURE 1, showing the openings in each side.

For a detailed discussion of the invention, reference is made to the drawings in which numeral 10 designates a chain, having a series of beads 12 connected together by straight links 14. A swivel connector 16, having an eye 18, is detachably connected to each end of the chain 10. Two spaced clips 20 and 21 are adjustably supported on the chain 10 intermediate the ends. Each of the clips 20 and 21 has a pair of divergently disposed resilient legs 22.

A central longitudinal slot 24, in each of the resilient legs 22 on the clips 20 and 21, is slightly wider than the diameter of the straight links 14 in the chain 10. A small circular enlargement 26 is provided at the upper end of each central longitudinal slot 24. A circular opening 28, slightly larger than the beads 12, is provided at the lower end of each central longitudinal slot 24. A small opening 30 is disposed directly below the circular opening 28 in each of the resilient legs 22.

In practice, the clips 20 and 21 are preferably made of materials that can successfully withstand the corroding effect of water. Stainless steel has proven very successful for this purpose. This discussion completes a detailed description of the structure characterizing the applicant's invention; however, to provide a more thorough understanding of the subject matter presented, a brief discussion will be directed to the manner in which the applicant's invention is used.

In use, a line, not here shown, is connected through the eye 18 in one of the swivel connectors 16 on the bead chain 10. A sinker, not herein disclosed, is attached to the other swivel connector 16. The two clips 20 and 21 are then adjusted to their desired positions on the chain 10. This is done by applying an upward force at the bottom of the clip, such as 21, with the chain 10 held stationary. This application of force, moves the straight links 14 in the chain 10, through the central longitudinal slot 24 in the clip 21.

This movement of the clip 21 places it in the position shown in FIGURE 1, thus aligning the beads 12 on the chain 10, with the circular opening 28 in the clip 21. The clips 20 and 21 can then be readily moved to any desired position on the chain 10. To re-secure the clip 21 on the chain 10, a downward force is applied to the clip 21 with the chain 10 being held stationary. This application of force moves the straight links 14 on the chain 10 upward through the central longitudinal slot 24 in the clip 21.

The clip 21 is thereby returned to the position shown by clip 20 in FIGURE 1. In this position, the beads 12 on the chain 10, adjacent the outer sides of the resilient legs 22 of the clips 20 and 21, seat in the circular enlargement 26 at the upper end of each central longitudinal slot 24. The resilient legs 22, in attempting to return to their normal unsprung position, shown by clip 21 in FIGURE 1, hold the beads 12, adjacent the outer side of each resilient leg 22, securely in seat.

The clips 20 and 21 are thus prevented from any longitudinal movement on the chain 10. However, the clips 20 and 21 are free to rotate about the chain 10, so as to prevent the entanglement of any lines attached thereto through the small openings 30. The number of clips 20 and 21 to be placed on the chain 10 can be varied to meet the requirements of each type of fishing.

Based upon the foregoing discussion, the applicant is of the opinion that his invention has fulfilled a long felt need in the field of fishing tackle, and that he has accordingly made a valuable contribution to the related art. However, while the invention was described with reference to the structural details of a single embodiment, it will be appreciated by those skilled in the art, that the principles involved are susceptible of numerous other practical applications.

Therefore, I claim as new, and desire to secure by Letters Patent:

An adjustable clip for a chain having a series of beads connected together by straight links, such clip comprising a member having two conjoined divergently disposed resilient legs, such legs each having therein a longitudinal slot with an enlargement at each end, the enlargements adjacent the conjoined ends of the legs being larger than the beads so that the chain may pass readily therethrough, and the others of said enlargements in the legs being smaller than the beads so as to provide seats for receiving the same, when the chain is disposed in the enlargements adjacent the conjoined ends of the legs, so that a downwardly directed force of sufficient magnitude applied to the clip will cause certain straight links of the chain to slide upwardly through the longitudinal slots until the bead adjacent the outside of each leg becomes holdably engaged on the seat provided in each of said legs.

References Cited in the file of this patent

UNITED STATES PATENTS

| | | |
|---|---|---|
| 1,385,032 | Baker | July 19, 1921 |
| 1,896,029 | Gunther | Jan. 31, 1933 |
| 2,007,431 | Malcom | July 9, 1935 |

FOREIGN PATENTS

| | | |
|---|---|---|
| 790,678 | Great Britain | Feb. 12, 1958 |